United States Patent
Hahn et al.

(10) Patent No.: US 7,199,366 B2
(45) Date of Patent: Apr. 3, 2007

(54) METHOD AND DEVICE FOR VISUALIZING A MOTOR VEHICLE ENVIRONMENT WITH ENVIRONMENT-DEPENDENT FUSION OF AN INFRARED IMAGE AND A VISUAL IMAGE

(75) Inventors: Wolfgang Hahn, Schwabhausen (DE); Thomas Weidner, Munich (DE)

(73) Assignee: Bayerische Moteren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/197,264

(22) Filed: Aug. 5, 2005

(65) Prior Publication Data

US 2005/0270784 A1    Dec. 8, 2005

Related U.S. Application Data

(63) Continuation of application No. PCT/EP2004/000848, filed on Jan. 30, 2004.

(30) Foreign Application Priority Data

Feb. 6, 2003   (DE) ............................... 103 04 703

(51) Int. Cl.
   *B60R 1/10*   (2006.01)
(52) U.S. Cl. .................... 250/330; 250/338.1
(58) Field of Classification Search ................ 250/330, 250/338.1
   See application file for complete search history.

(56) References Cited

U.S. PATENT DOCUMENTS 4,967,276 A * 10/1990 Murakami et al. .......... 348/164
5,001,558 A * 3/1991 Burley et al. ............... 348/164
6,150,930 A   11/2000 Cooper
6,163,309 A   12/2000 Weinert
6,961,466 B2 * 11/2005 Imagawa et al. ........... 382/190

FOREIGN PATENT DOCUMENTS

| DE | 43 02 385 C2 | 8/1993 |
| DE | 196 38 140 A1 | 3/1998 |
| DE | 198 01 884 A1 | 7/1999 |
| DE | 691 32 203 T2 | 2/2001 |
| DE | 100 16 184 C2 | 10/2001 |
| DE | 102 18 175 A1 | 11/2003 |
| EP | 0 505 237 A1 | 9/1992 |
| FR | 2 687 000 | 8/1993 |
| WO | WO 03/107067 A2 | 12/2003 |

* cited by examiner

*Primary Examiner*—David Porta
*Assistant Examiner*—Christine Sung
(74) *Attorney, Agent, or Firm*—Crowell & Moring LLP

(57) ABSTRACT

A method is provided for visualizing the environment of a vehicle, particularly in darkness. For improving known methods, a weighted superimposition of isochronous and same-location image pairs of a visual image and an infrared image are performed for forming a fusion image. For a further improvement, it is provided to make the weighting dependent on the environment; thus, in darkness, a higher weighting and therefore a stressing of the infrared information is provided with respect to the visual information in the fusion image. In fog, it is provided to weight the visual information clearly higher in comparison to the infrared information, whereby the infrared information, which is often not very helpful in fog, is largely not taken into account in the fusion image. For implementing the method, a system is provided having a color-sensitive visual camera, an infrared camera and a fusion or superposing device, which superposes isochronous and same-location image pairs by pixels or areas and/or forms average values.

53 Claims, 1 Drawing Sheet

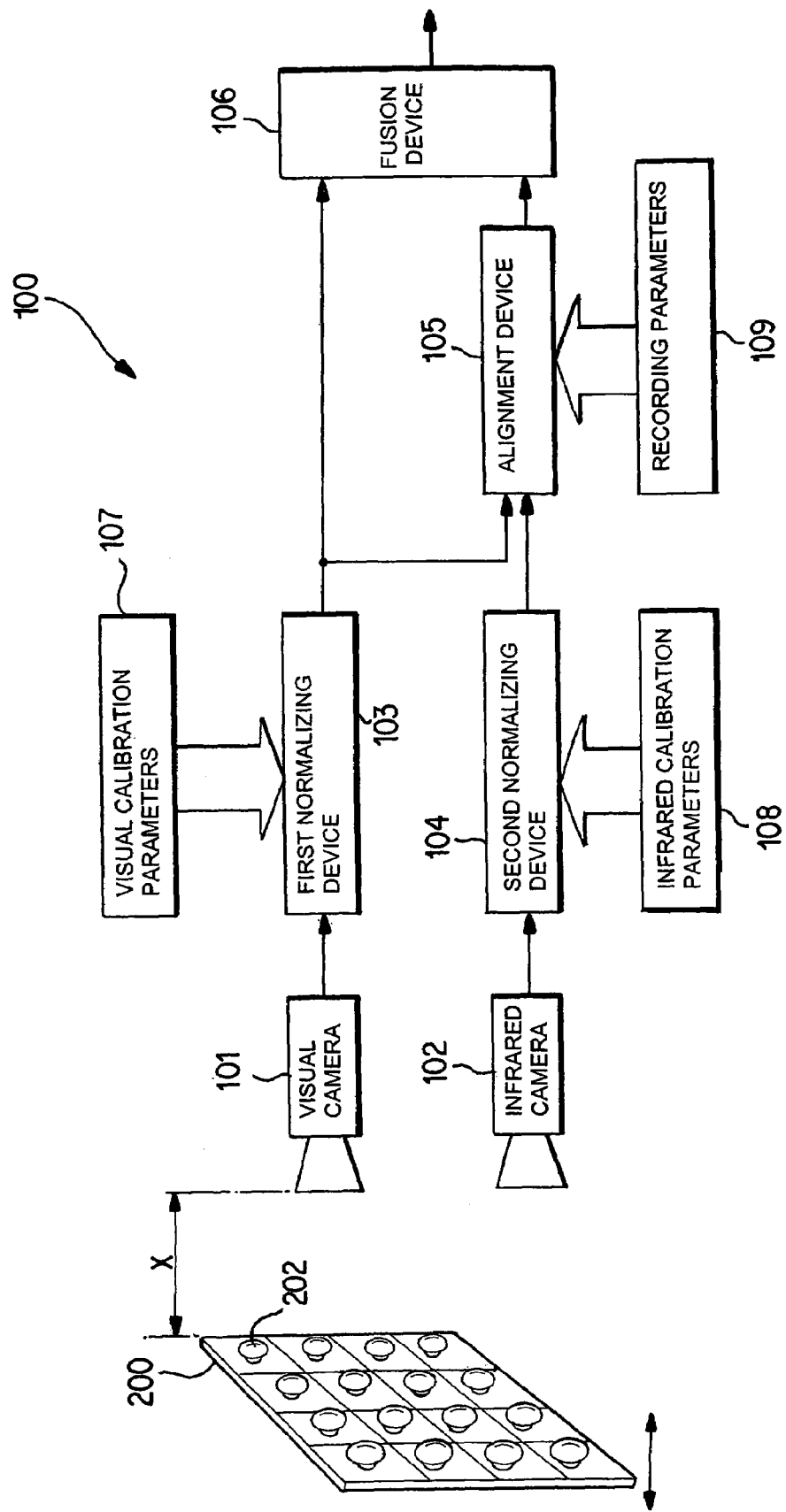

US 7,199,366 B2

METHOD AND DEVICE FOR VISUALIZING A MOTOR VEHICLE ENVIRONMENT WITH ENVIRONMENT-DEPENDENT FUSION OF AN INFRARED IMAGE AND A VISUAL IMAGE

CROSS-REFERENCE TO RELATED APPLICATIONS

This application is a continuation of PCT Application No. PCT/EP2004/000848 filed on Jan. 30, 2004, which claims priority to German Application No. 103 04 703.4 filed Feb. 6, 2003.

BACKGROUND AND SUMMARY OF THE INVENTION

The invention relates to a method and a system for visualizing the environment of a vehicle as well, as to a calibrating device for calibrating the system.

A night vision system for a vehicle is known from German Patent document DE 695 06 174 T2. The system has an infrared camera generating an infrared image, which shows the heat radiation of a portion of the environment of the vehicle emanating from persons and objects. The infrared image is projected by way of a head-up display onto the lower part of the windshield, and is thereby made visible to the driver.

The assignment of persons and objects in the infrared image to the traffic situation situated in front of the driver and visually detectable through the windshield is to be made by the driver. This is difficult and, often even impossible, particularly in darkness, for which the known system is intended, because the infrared image shows persons and objects which the driver cannot recognize visually. A more exact position determination of the persons and objects recognizable only in the infrared image is therefore not possible on a regular basis and dangerously diverts the driver's attention.

It is a particular object of the invention to indicate an improved method and a system for visualizing the environment of a vehicle, particularly an improved night vision system.

The object of the invention is achieved by providing a method of visualizing the environment of a vehicle, particularly in darkness, the method including: providing a visual image or its digital data of the environment, preferably a colored visual image, the visual image showing the visible objects; and providing an infrared image or its digital data of the environment, the infrared image showing the infrared radiation emanating from the visible and/or other objects. The system is characterized by a visual camera, preferably a color-sensitive visual camera, an infrared camera, a first normalizing device for normalizing the preferably colored visual image of the cutout of the environment of the vehicle provided by the visual camera, a second normalizing device for normalizing the infrared image of the cutout of the environment of the vehicle provided by the infrared camera, an aligning device for generating largely isochronous and same-location image pairs from visual images and infrared images, and a fusion or superposition device, which superposes the largely isochronous and same-location image pairs by pixels or areas and/or forms average values. Advantageous embodiments of the invention are described and claimed herein.

A first aspect of the invention consists of the display or visualization of a combination or superposition of a visual image, in the following called visual image, and of an infrared image, in the following called infrared image, of the largely identical cutout of the environment of a vehicle. As a result of this superposition or fusion of the images of different spectral ranges of the same scene, the above-described disadvantages of the state of the art are largely eliminated.

A second aspect consists of weighting the two spectral fractions (visual fraction and infrared fraction) during the fusion of the respective visual image and of the infrared image as a function of the actual driving situation relative to one another. In the first extreme case of the weighting, the image created by fusion largely has only the visual information—as a rule a superposition of visual and infrared information—, and in the second extreme case of the weighting, the image created by fusion largely has only the infrared information.

If, for example, on a country road, a vehicle, which is driving ahead, is detected by a ranging system, such as a known radar-supported automatic cruise control (ACC) system, it is provided in an embodiment of the invention that this vehicle be highlighted during the fusion of the two spectral fractions in contrast to the driving environment, so that it is more clearly visible in the fusion image in comparison with the environment. This can take place, for example, in that the weighting of the two spectral fractions for the relevant range is changed in comparison to the driving environment. In this example, here, it is that image cutout of the fusion image which shows the vehicle driving directly ahead. During the day the visual information, for example, can be weighted higher than the infrared information and can, therefore, be indicated more clearly in the fusion image, while the weighting takes place exactly the other way around during darkness.

When the vehicle is driving in a well-lit area, it is provided in another embodiment of the invention, as an alternative or in addition, that the visual fraction or the visual information be weighted higher than the infrared fraction or the infrared information. On a dark country road and/or on a turnpike, as an alternative or in addition, the weighting is carried out the other way around in comparison to the above-mentioned weighting, so that the infrared information or the infrared fraction appears more clearly than the visual fraction in the fusion image.

As an alternative or in addition, it is provided in another embodiment of the invention that, on a dark country road and/or turnpike, the infrared information of more distant objects is highlighted by their higher weighting during the fusion—in contrast to objects less distant from the vehicle. If necessary, the fusion image offered to the driver in a display may have a higher fraction of visual information in the close range and a higher fraction of infrared information in the distant range.

In rain, fog or on a wet road, the usability of the infrared channel or of the infrared information is limited compared to normal conditions. In order to counteract a deterioration of the fusion image as a result of infrared information, which at such weather conditions may at best be usable to a limited extent, it is provided, as an alternative or in addition, that the visual fraction be increased with respect to the infrared fraction; that is, the weighting of the two spectral fractions in the fusion image is changed correspondingly in the direction of visual information.

For detecting the above-mentioned weather conditions, particularly a rain sensor or a fog sensor can be provided on the vehicle. Likewise, it can be analyzed which vehicle lights are switched on, as particularly the fog lights. However, this information can also be supplied by a dynamic navigation system provided in the vehicle, into which the dynamic traffic or weather conditions for the current location of the vehicle, or particularly also in advance for the planned driving route, are transmitted. This transmission can take place by way of a cellular network or by a vehicle-to-vehicle communication.

As an alternative or in addition, it is provided in an embodiment of the invention that the driver can manually adjust the weighting of the two spectral fractions with respect to one another in the fusion image and, thereby, can optimally adapt them to his needs and special circumstances. A continuous transition of the representation from visual information to infrared information and vice-versa is provided according to an embodiment of the invention. This makes it possible for the driver to use the relationship between visual and infrared information and the influence on the fusion image of the driving environment by the displacement between the spectral fractions more easily and faster in a beneficial manner in the sense of a more rapid and more reliable detection of the traffic situation.

As an alternative or in addition, in a further embodiment, a plurality of fusion images is offered to the driver for the selection of a fusion image which appears suitable to him, the fusion images offered for the selection differing in their relationship of the fraction of visual information to infrared information. In particular, a different weighting of the visual fraction with respect to the infrared fraction may have taken place during the fusion.

In a concrete further development of the night vision system according to the invention, the visual camera or the first sensor or their lens system has a first optical axis, and the infrared camera or the second optical sensor or their lens system has a second optical axis, which are spatially offset with respect to one another. The cameras or sensors, therefore, at least partially detect different cutouts of the environment of the vehicle; that is, a first and a second cutout. In addition, these cutouts are a function of the distance. It is understood that, according to the invention, more than two infrared cameras or infrared sensors, whose sensitivity covers different wavelengths, can be provided, and the digital images of the vehicle environment supplied by them can be superposed or fused.

In order to obtain a fusion image for presentation to the driver which is largely free of distortions, it is provided in an embodiment of the invention that the provided first cutout and the provided second cutout are completely or partially superposed or fused by using a superposition or fusion device with respect to pixels and/or areas. For providing the fusion image, the first cutout and/or the second cutout and/or the fusion image or their direct or processed digital data are adapted by using at least one adaptation parameter.

This or these distance-dependent parameters are, preferably, determined during the calibration of the camera or sensor system or night vision system according to the invention for at least two distance ranges or spacing ranges between the cameras or sensors and a calibrating device. The adaptation parameter(s) are adjusted such that the fusion image of objects in the corresponding distance range created during the superposition or fusion of the images is largely without distortions, for example, particularly free of ghost images or double images. According to the invention, the adaptation parameter(s) are, particularly, at least one recording or transformation parameter. A similar parameter is known, for example, from the recording of a digital image processing system and superpositions of two images thereby implemented. The driving-situation-dependent or distance-dependent adaptation parameter(s) are, preferably, stored in a data memory in the vehicle during the calibration.

In a preferred embodiment of the invention, a first distance range corresponds to a driving situation typical of city driving, as particularly a distance range of approximately 15 to 75 m.

As an alternative or in addition, a second distance range corresponds to a driving situation typical of driving on a country road, as particularly a distance range of approximately 30 to 150 m.

As an alternative or in addition, a third distance range corresponds to a driving situation typical of driving on a turnpike, as particularly a distance range of approximately 50 to 250 m.

It is understood that, as an alternative or in addition to the above-mentioned distance-dependent or distance-range-dependent adaptation parameters, other driving-situation-dependent adaptation parameters can also be determined, particularly with the above-mentioned objective. These may, for example, be suitable adaptation parameters for drives when the sun is in a low position, in fog, at dusk, or in darkness.

Another aspect of the invention consists of automatically determining the current driving situation of the vehicle and providing the adaptation parameter(s) corresponding to the current driving situation or environmental situation, particularly obtained by calibration and stored in the vehicle, to be used by the aligning device according to the invention or by the superposition or fusion device. The superposition or fusion device carries out a pixel-type and/or area-type superposition or fusion of the visual image present in the form of digital data and of the infrared image, in which case one or more distance-dependant adaptation parameters influence the infrared image and/or the visual image and/or the fusion image, such that, preferably, a fusion image of the environment is provided to the driver which is largely free of distortions and/or ghost images.

As an alternative or in addition to the above-mentioned automatic determination, it is provided in an embodiment of the invention that the driver selects adaptation parameters, which appear suitable to him, and in particular, are obtained by calibration and are stored in the vehicle, for use by the aligning device according to the invention or by the superposition or fusion device. Thus, for example, the adaptation parameter(s) for a driving situation typical of city driving, typical of country road driving, typical of turnpike driving and/or, if required, for additional driving situations, can be offered to the driver for selection, for example, in the form of a manual selection possibility or by voice input. This enables the driver, even without a vehicle navigation system situated in the vehicle, to himself create a fusion image largely free of distortions or double images. The driver is additionally enabled, if necessary, to override an automatic selection. Likewise, it can become possible for the driver to select one or more adaptation parameter(s), which display to him the closer environment of his vehicle without distortions in the fusion image, for example, distances of up to 20 m from his vehicle. This selection can be made by the driver, for example, when he approaches his garage in darkness and wants to find out by means of the infrared information in the fusion image whether anyone is lying in wait for him behind a bush.

In a preferred embodiment of the invention, the current position of the vehicle is determined by a vehicle navigation system, particularly a satellite navigation system. By using the position information, the navigation system situated in the vehicle automatically determines, by a comparison with digital map data, the corresponding road category or driving situation, such as particularly a city street, a country road or a turnpike. Currently, such vehicle navigation systems already exist in numerous vehicles for the purpose of routing, etc. and can be utilized without any high expenditures for the above-mentioned automatic driving-situation-dependent and environment-dependent optimization of the fused images of the environment of the vehicle.

As an alternative or in addition, it is provided in another embodiment of the invention that the driving situation is determined by using at least one driving-dynamic quantity, such as particularly the vehicle speed and/or the operation of the low beam or high beam and/or the vehicle acceleration and/or brightness and/or fog. In today's vehicles, such information can completely or partially be provided through the existing electronics without requiring greater expenditures.

In a preferred embodiment of the invention, a colored visual image is fused or combined with the infrared image or superposed on the latter. In contrast to a black-and-white visual image, a fused image is created which contains colored information of the visual image, such as red brake lights of a vehicle driving ahead, a red traffic light, a colored traffic sign, or the like. The colored information in the fused image facilitates a fast orientation and detection of the traffic situation shown in the fused image for the driver of a correspondingly equipped vehicle. In addition, the color information reduces the risk that colored warning signs (red traffic lights, etc.) are overlooked.

Summarizing, the images of the environment or scene for different spectral ranges are, in each case, freed of disturbing influences, such as distortions of the infrared or visual image, particularly as a result of the used lens system, etc. With respect to the software, this preferably takes place by known measures for processing digitized images. The images or their digital image data largely freed of disturbing influences preferably are aligned with respect to one another or made congruent by digital image processing, so that largely isochronous and same-location image pairs of the infrared and visual image or their digital data are present. According to the invention, this takes place by using at least one distance-dependent and/or driving-situation-dependent adaptation parameter for obtaining a distortion-free fusion image. The software and hardware used for the digital image processing preferably allows a displacement, a rotation, and a scaling of the images relative to one another. As a result of this processing, the subsequent hardware expenditures for the superposition or fusion of the images from the different spectral ranges can be minimized in a cost-effective manner—despite a largely real-time processing of isochronous and same-location image pairs.

According to a preferred embodiment of the invention, the infrared images and the visual images are generated with a respectively identical image repetition rate, preferably by one or two cameras or sensors for these spectral ranges. As a result, isochronous image pairs of the infrared image and the visual image can be generated in a particularly simple manner, which considerably reduces the software and hardware expenditures for the subsequent superposition or fusion of the two images according to the invention—largely in real time. The processing speed of the image pairs increases; the costs for the semiconductor memory for the intermediate storage of the images are minimized.

In a preferred embodiment of the invention, the infrared image shows the infrared radiation or heat radiation emanating from persons and objects, which radiation is in a wavelength range from approximately 8 to 14 μm. Preferably, an IR camera or an IR sensor is used, which is sensitive in the range from approximately 8 to 10 μm. This advantageously eliminates an infrared radiator or other such illumination (typical wavelength range of approximately 800 nm to 2.5 μm) in the vehicle environment. A mutual blinding of oncoming vehicles, which in a known manner are each equipped with an infrared illumination, does not occur. Likewise, the infrared image according to the invention is not limited to the range of an infrared illumination.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram of a system according to the invention for visualizing a cutout of the environment of a vehicle or a night vision system by which the method for visualization according to the invention is described.

DETAILED DESCRIPTION OF THE DRAWINGS

The device or night vision system 100 according to the invention illustrated in FIG. 1 as a block diagram has an electronic, here a so-called visual camera 101 operating in the visual spectral range, such as a CCD sensor, an electronic infrared camera 102 sensitive in the infrared spectral range of approximately 8 to 10 μm, such as an IR sensor, a first normalizing device 103, a second normalizing device 104, an aligning device 105, and a superposition or fusion device 106. The visual camera 101 supplies a colored visual image.

The optical axes of the cameras 101 and 102 are, preferably, aligned parallel to one another, whereby the parallax error can be minimized, and are preferably situated close to one another, whereby displacement errors are minimized. The image planes of both cameras or sensors are preferably aligned parallel to one another and perpendicular to the optical axis and are situated close to one another. The photosensitive sensor surfaces of both cameras or sensors are preferably neither rotated nor tilted relative to one another, but rather are largely arranged parallel to one another. In addition, the two cameras or sensors preferably have the same aperture angle. As a result of these measures, it can be achieved that the cameras or sensors supply images of different spectral ranges, which show largely the same cutout of the environment and are not rotated relative to one another and to the actual situation. As a result, the expenditures for processing the images for providing a fused image from the two images and, thus, the hardware and software expenditures can clearly be reduced.

The optical surfaces of the cameras are, preferably, hydrophobically coated, and a high-pressure nozzle or the like, as already customary for the headlight cleaning, is preferably provided for their cleaning. Both cameras are preferably installed in a joint housing (providing easy mounting, overall alignment with respect to the vehicle axis, no displacement of optical parameters of the cameras with respect to one another). Fastenings are preferably arranged on the housing of the cameras, which fastenings ensure a low-vibration operation of the cameras on or in the vehicle. Connections for the operating voltage are provided for the operation of the cameras. The operating voltage of the cameras should be flexibly adaptable to the respective vehicle wiring voltage, such as 12 Volt and/or 42 Volt. In order to protect the electronic system and the sensors of the cameras from damage, an overload protection and a reverse battery protection are preferably inserted in the operating voltage branch. The output of video signals generated by the cameras or sensors (spectral ranges separate or already fused) should be oriented according to a standard (such as NTSC, PAL, SECAM or a separate standard). Existing semiconductor elements can be used as digital-to-analog converters. For visualizing the driving environment, the cameras or sensors can be mounted behind and laterally of the vehicle.

The calibration of the night vision system or of the device 100 will be described in detail in the following. A calibration device 200 according to the invention is used for the calibration. This calibrating device has several incandescent lamps which, preferably, are arranged in a checkerboard-type manner. The incandescent lamps are characterized in that they emit heat radiation as well as visible radiation. Preferably, a plate or the like equipped with several incandescent lamps is arranged successively at different distance ranges "x" in front of the two cameras or sensors 101 and 102. The distance ranges are typical environment-dependent or driving-situation-dependent distance ranges, which will be explained in detail in the following.

The calibrating device 200, which is situated in front of the cameras 101 and 102, and which is preferably arranged in a dark environment and not in the vicinity of heat sources, generates a (so-called) visual image in the visual camera 101, which visual image shows the incandescent lamps arranged in a checkerboard-type manner, as also seen by the human eye. In addition, the calibrating device generates a heat image in the infrared camera 102, which also shows the arrangement of the incandescent lamps. Typically, the visual image as well as the so-called infrared image, particularly because of optical imaging errors, etc., has distortions at the edges of the respective image. In a known manner, the distortions or imaging errors in the visual image are largely eliminated by a first normalizing device 103. In a known manner, the distortions or imaging errors in the infrared image are largely eliminated by a second normalizing device 104. The normalizing or error elimination preferably takes place by known software-type measures on the digital data of the images (digital data processing), using calibration parameters 107 for the visual image and calibrating parameters 108 for the infrared image.

The images or their digital data, which were normalized or largely freed of disturbances, etc., are aligned with respect to one another by a recording operation known per se in digital image processing by the use of an alignment device 105 using recording parameters 109. During the aligning operation, one of the images preferably remains unchanged and is used as a reference for the other image. With respect to the size and the position, the second image is changed such that an image is created whose object is largely the same relative to the first image.

The normalized images are therefore aligned relative to one another such that one and the same object appears at largely the same location in largely the same size in the fused image. If this preprocessing step is not carried out, shadow or double images will occur because of different camera geometries and the camera offset. This means that an object appears at two locations and in different sizes in the fused image. This type of an image irritates the observer more than it provides an orientation for him.

For the environment-dependent or driving-situation-dependent optimization of a fusion which is accurate with respect to pixels or areas, a first recording operation is carried out for a driving situation typical of city driving. For this purpose, the distance between the calibrating device 200 and the cameras 101 and 102 is varied, for example, in the range from approximately 15 to 75 m, and the recording parameter(s) suitable for this distance range are determined and stored. In a corresponding manner, a second recording operation is carried out for a driving situation typical of country roads, that is, for example, a range of approximately 30 to 150 m. Finally, in a corresponding manner, a third recording operation is carried out for a driving situation typical of a turnpike, that is, for example, in the range of approximately 50 to 250 m.

By using the up-to-date position data provided by a vehicle navigation system (not shown), the system determines by use of digital map data the road category or driving situation corresponding to the position of the vehicle, such as particularly a city road, a country road or a turnpike. Particularly in darkness, the recording or adaptation parameters corresponding to the driving situation and stored in the vehicle during calibration operations are used by the superposition or aligning device 105 for the alignment of the images appropriate for the driving situation. Thus, particularly shadow, double or ghost images are largely avoided in the fused image for the corresponding driving situation.

As an alternative or in addition, the actual driving situation of the vehicle is determined by the use of at least one driving-dynamic quantity. The recording or adaptation parameters assigned to the driving-dynamic quantity (quantities) and stored in the vehicle, according to the invention, are used by the superposition or aligning device 105 for the alignment of the images appropriate for the driving situation. Also as a result of this measure, particularly shadow images, double images or ghost images in the fused image for the corresponding driving situation are largely avoided. The driving-dynamic quantities of the vehicle are, in particular, its speed, the switching-on of the low beam or the high beam, or its positive or negative acceleration.

The above-mentioned alignment of the normalized images can be divided into three steps: displacement, rotation and scaling. In practice, it was found that the rotation, scaling and displacement sequence qualitatively supplies the best results. Since the sequence of these steps is generally not commutative or exchangeable, care should be taken that the sequence of these steps is the same during calibration and during subsequent operation of the night vision system according to the invention. As required, the calibrating and/or operating software of the night vision system is to be designed correspondingly.

In a superposition or fusion device 106, the mutually aligned images are superposed or fused with respect to the software by the processing of their digital data. From each image pair of the visual image and the infrared image, which are identical with respect to the time and the location of the object, a fused or superposed image is generated, which is displayed to the driver of the vehicle preferably on a color monitor in the vehicle.

Preferably, a fusion of the isochronous and same-location image pairs of the visual image and the infrared image takes place on the basis of individual, mutually assigned pixel pairs of the two images, or by using several pixels from the two images. In particular, this may depend on which resolution is desired and/or which computing power is available for the digital image processing. The images preprocessed as described above are superposed by the digital processing of their image data and displayed. With respect to the result, this operation can be compared, approximately, with the superposing of foils or slides of the same scene or driving environment. With respect to computing or during the digital image processing, this is achieved by averaging the pixel information, particularly while taking into account their brightness in the respective images and the color information contained in the visual image and/or in the infrared image. This must not necessarily take place pixel by pixel, but can also take place by averaging for pixel areas in the two images which are identical with respect to location and time.

It may also be useful to weight the pixel information in the infrared image during the averaging differently than the isochronous and same-location pixel information in the visual image. This different weighting can take place, for example, as a function of the daylight and/or as a function of the weather and/or as a function of the light of the headlights of the motor vehicle and/or as a function of the color of the visual image; it can thereby be achieved, for example, that a red traffic light is particularly clearly detectable in the fusion image. Furthermore, the weighting of the partial areas of the fusion image, for example, the difference between the foreground and the background, or the entire fusion image, can be manually changeable by the driver.

Using this approach, individual image areas can be particularly highlighted. Thus, for example, the immediate driving range of the vehicle can be stressed more in order to achieve a certain guidance of the driver.

As darkness increases, the weighting of the infrared information with respect to the visual information may increase when forming the average. When the low beam is switched on, the weighting of the infrared information may be increased with respect to the visual information in comparison to the switched-on high beam.

Likewise, the information content of an area in the respective image may also determine the weighting. If the information content in an isochronous and same-location area of the visual image is, for example, clearly higher than in the same area of the infrared range, it may be useful to take this into account by a higher weighting of the visual information when forming the average.

As described above, the images generated by the cameras or sensors have to be preprocessed in order to be aligned in a corrected manner and be true to the object. In order to save memory, which is cost-intensive, the software algorithm, preferably with respect to pixels, accesses the sensor information of the cameras 101 and 102.

The devices for the digital image processing illustrated in FIG. 1 are, completely or partially, preferably one or more software-controlled digital processors, which were preferably optimized for the digital image processing in real time. Likewise, it is, however, also contemplated to use one or more software-controlled CP processors in a cost-effective manner if their processing speed allows an extensive real-time processing of the images for providing a fusion image with visual and infrared information.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of visualizing an environment of a vehicle, the method comprising the acts of:

supplying a visual image of the environment, the visual image showing visible objects located in the environment;

supplying an infrared image of the environment, the infrared image showing infrared radiation emanating from the visible and other object; and providing a fused image based on the visual and infrared images and at least one image adaptation parameter affecting image presentation and associated with at least one calibration, the fused image having a visual fraction, including the visible objects, and an infrared fraction, including the infrared radiation, that are superosed and weighted based on a condition of the environment.

2. The method according to claim 1, wherein providing a fused image comprises:

aligning at least one of the visual image and a normalized visual image with at least one of the infrared image and a normalized infrared image, so that substantially isochronous and same-location image pairs of the infrared and visual spectral ranges are provided, the aligning based on the at least one image adaptation parameter.

3. The method according to claim 2, wherein providing a fused image further comprises:

superposing same-location pixels of the substantially isochronous and same-location image pairs by at least one of processing associated digital data and performing an averaging of pixel information.

4. The method according to claim 3, wherein the superposing is based on at least one of brightness values and color values of the pixels or pixel areas.

5. The method according to claim 3, wherein the visual and infrared fractions are combined and weighted such that a weighted superposition takes place for one or more substantially same-location pixels from the visual image and the infrared image.

6. The method according to claim 5, wherein the weighted superposition takes place while taking into account at least one of the brightness and the visual conditions of the environment of the vehicle.

7. The method according to claim 3, wherein infrared pixels and visual pixels are weighted differently when superposing mutually assigned pixels.

8. The method according to claim 3, wherein at least one of an actual driving situation of the vehicle is determined automatically, and a driver selects an adaptation parameter appearing suitable to him from a plurality of adaptation parameters, and further wherein the adaptation parameter corresponding to the actual driving situation or the one selected, obtained by calibration and stored in the vehicle, is taken into account during the pixel and/or pixel area superposition or fusion of the visual image and of the infrared image by digital fusion image processing, whereby a largely distortion-free and/or ghost-image-free fusion image of the environment is created.

9. The method according to claim 1, wherein high-information regions are weighted higher than low-information regions of at least one of the visual fraction and the infrared fraction.

10. The method according to claim 1, wherein at least one of the weighting and the superposition of spectral fractions is manually adjusted by a user.

11. The method according to claim 1, wherein at least one of the weighting and the superposition of spectral fractions is adjusted as a function of the condition of the environment, which takes into account at least one of ecology-dependent parameters, driving-situation-dependent parameters, and output signals of sensors.

12. The method according to claim 11, wherein the adjustment to the spectral fractions takes place for an entire fused image or for a partial area of the entire fused image.

13. The method according to claim 11, wherein the adjustment depends on an actual brightness of the surroundings of the vehicle.

14. The method according to claim 11, wherein the driving-situation-dependent adjustment depends on the actual driving-dynamic quantities of the vehicle.

15. The method according to claim 14, wherein the actual driving-dynamic quantities of the vehicle include at least one of vehicle speed, vehicle acceleration, and vehicle steering angle.

16. The method according to claim 11, wherein an actual position of the vehicle is determined automatically by a vehicle satellite navigation system, and at least one of a road category and a driving situation corresponding to the position is determined.

17. The method according to claim 16, wherein the driving situation is determined automatically via at least one driving-dynamic quantity from among: a vehicle speed, an operation of a low beam or a high beam, and a vehicle acceleration.

18. The method according to claim 1, wherein the condition of the environment is determined via a navigation system.

19. The method according to claim 1, wherein the condition of the environment is associated with at least one of: fog, rain, a reflective road, a distance to a vehicle driving ahead, city driving, country driving, or turnpike driving.

20. The method according to claim 1, wherein the visual image is provided by a visual camera sensitive in a visual spectral range, and the infrared image is provided by an infrared camera sensitive in the infrared spectral range.

21. The method according to claim 20, wherein the visual camera has a first optical axis, and the infrared camera has a second optical axis, which axes are offset parallel to one another, so that the cameras at least partially provide first and second cutouts of the environment of the vehicle which are different from one another.

22. The method according to claim 21, wherein the first cutout and the second cutout are at least partially fused with respect to pixels and/or pixel areas by a fusion device, and further wherein during the fusion at least one distance-dependent adaptation parameter obtained during a calibration for different distances is taken into account, and the adaption parameter(s) are stored during the calibration in a data memory in the vehicle.

23. The method according to claim 22, wherein at least one distance-dependent adaptation parameter is obtained by a first calibration for a first distance, or a first distance range, and at least one other calibration for at least one other distance, or other distance range.

24. The method according to claim 23, wherein the first distance or the first distance range corresponds to a driving situation typical of city driving in a distance range of approximately 15 to 75 m.

25. The method according to claim 24, wherein a second distance or a second distance range corresponds to a driving situation typical of country road driving in a distance range of approximately 30 to 150 m.

26. The method according to claim 23, wherein a second distance or a second distance range corresponds to a driving situation typical of country road driving in a distance range of approximately 30 to 150 m.

27. The method according to claim 26, wherein a third distance or a third distance range corresponds to a driving situation typical of turnpike driving in a distance range of approximately 50 to 250 m.

28. The method according to claim 20, wherein an image repetition rate of the visual camera and of the infrared camera are at least largely identical.

29. The method according to claim 28, wherein providing at least one fused image comprises:
superposing same-location pixels or pixel areas of the largely isochronous and same-location images of the different spectral ranges by processing associated digital data or by carrying out an averaging.

30. The method according to claim 29, wherein the superposing is based on at least one of brightness values and color values of the pixels or pixel areas.

31. The method according to claim 30, wherein a weighted superposition takes place for one or more largely same-location pixels from the visual image and the infrared image.

32. The method according to claim 1, wherein the infrared radiation emanating from the at least one of the visible objects and other objects, and detected, has a wavelength in the range of approximately 7 to 14 µm.

33. The method according to claim 32, wherein the range is approximately 7.5–10.5 µm.

34. The method according to claim 1, wherein the infrared radiation emanating from the at least one of the visible objects and other objects, and detected, has a wavelength in the range of approximately 3 µm to approximately 5 µm.

35. The method according to claim 1, wherein the infrared radiation emanating from the at least one of the visible objects and other objects, and detected, has a wavelength in the range of approximately 800 nm to approximately 2.5 µm.

36. The method according to claim 1, wherein the visual image of the environment of the vehicle present in the form of digital data is normalized by using a calibration device.

37. The method according to claim 32, wherein the infrared image of a cutout of the environment present in the form of digital data is normalized by using a calibration device.

38. The method according to claim 37, wherein visible radiation and infrared radiation is emitted by the calibration device.

39. The method according to claim 38, wherein the calibration device has several incandescent lamps arranged in a checkerboard-type manner.

40. The method according to claim 1, wherein the digital data of the visual image and/or the infrared image are temporarily stored in an image data memory.

41. The method according to claim 1, wherein the visual image is provided by one of a color-sensitive visual camera or a first sensor, and the infrared image is provided by one of an infrared camera or a second sensor.

42. The method according to claim 1, wherein the condition of the environment includes at least one of an ecological condition, a vehicle condition, a driving situation, and a user preference.

43. The method according to claim 1, wherein the at least one adaptation parameter is based on at least one of distance, range, ecological conditions, and driving conditions.

44. The method according to claim 1, wherein the aligning comprises a stage selected from the following:
altering the at least one of the visual image and normalized visual image to align with the at least one of the infrared image or normalized infrared image, and altering the at least one of the infrared image and normalized infrared image to align with the at least one of the visual image or normalized visual image.

45. The method according to claim 1, wherein the visual fraction includes a plurality of individually weighted pixel areas and wherein the infrared fraction includes a plurality of individually weighted pixel areas.

46. The method according to claim 1, wherein the visual fraction is weighted higher than the infrared fraction in a foreground of the fused image and wherein the visual fraction is weighted less than the infrared fraction in a background of the fused image.

47. The method according to claim 1, wherein the visual and infrared fractions are weighted such that pixel information in the visual image is weighted differently than isochronous and same-location pixel information in the infrared fraction based on the condition of the environment.

48. A system for visualizing an environment of a vehicle, the system comprising:
   a visual camera;
   an infrared camera;
   a first normalizing device for normalizing a visual image of a cutout of the environment of the vehicle supplied by the visual camera;
   a second normalizing device for normalizing an infrared image of a cutout of the environment of the vehicle supplied by the infrared camera;
   an alignment device which generates substantially isochronous and same-location image pairs from the visual and infrared images based on at least one adaptation parameter that is associated with a calibration and affects image presentation; and
   a fusion device configured to generate a fused image by combining the largely isochronous and same-location image pairs, the fused image having a visual fraction and an infrared fraction that are respectively weighted based on a condition of the environment.

49. The system according to claim 48, wherein the visual camera is a color-sensitive visual camera.

50. The system according to claim 48, further comprising a calibration device, the calibration device including at least one radiation source emitting visual and infrared radiation.

51. The system according to claim 50, wherein the at least one radiation source is an incandescent lamp.

52. The system according to claim 50, wherein the calibration device includes a plurality of radiation sources arranged in a checkerboard manner.

53. The system according to claim 48, wherein the condition of the environment includes at least one of an ecological condition, a vehicle condition, a driving situation, and a user preference.

* * * * *